United States Patent [19]

Hofmann et al.

[11] 3,873,737

[45] Mar. 25, 1975

[54] METHOD OF MAKING AN ENCASED GROUND MEAT PRODUCT

[76] Inventors: Richard E. Hofmann, 504 Wimer Cir.; Francis R. Walters, 8494 Lincoln Blvd., both of Pittsburgh, Pa. 15237

[22] Filed: Mar. 21, 1973

[21] Appl. No.: 343,366

[52] U.S. Cl. ............... 426/105, 426/92, 426/135, 426/284, 426/302, 426/413
[51] Int. Cl. ............................................. A22c 13/00
[58] Field of Search ............ 426/92, 105, 129, 135, 426/410, 412, 413, 415, 284, 302, 342; 17/49

[56] References Cited
UNITED STATES PATENTS

| | | | |
|---|---|---|---|
| 2,788,279 | 4/1957 | Luer | 17/49 |
| 3,635,738 | 1/1972 | Hofmann et al. | 426/105 |

*Primary Examiner*—Hyman Lord
*Attorney, Agent, or Firm*—Parmelee, Miller, Welsh & Kratz

[57] ABSTRACT

A sock or casing of fibrous paperlike material and substantially symmetrical shape for receiving and protecting a food product or mixture such as ground meat has an attractive outer facing that provides a substantially smooth and uniform coverage thereof. The casing is constructed and utilized in accordance with procedure that uses cross-thread, edge-overlapping stitching along its opposed side edges and to close-off its angularly converging bottom edges. The food product is directly inserted into an open upper end of the casing without turning it inside out, an open upper end of the casing is closed-off after it has been stuffed with the food or meat product, a continuous loop length of braided thread strand extends across the top end of the casing for suspending it and the food product carried thereby, and an outer facing of appropriate and attractive appearance is applied as a liquid to the casing and solidified thereon.

6 Claims, 13 Drawing Figures

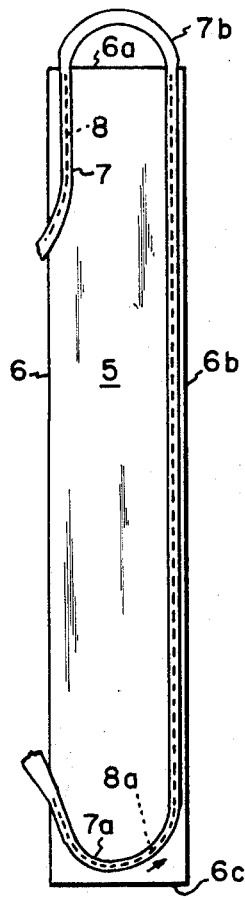
Fig.1
(PRIOR ART)
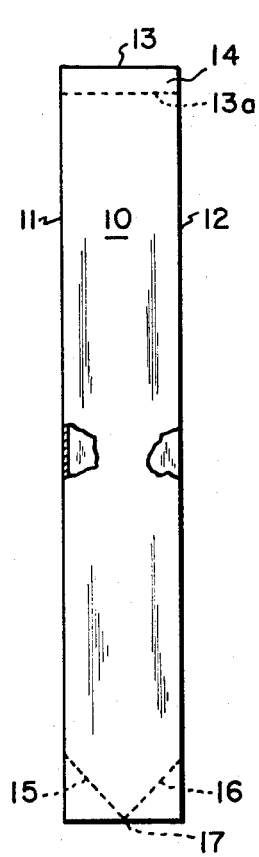
Fig.2
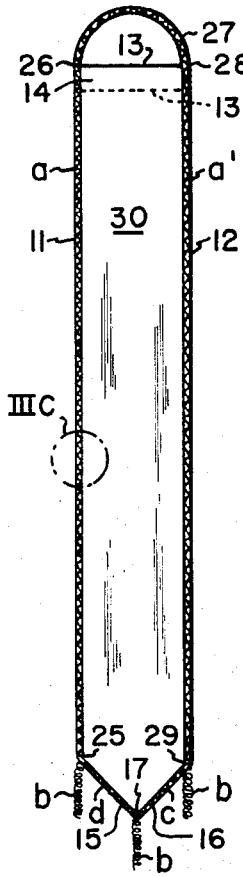
Fig.3
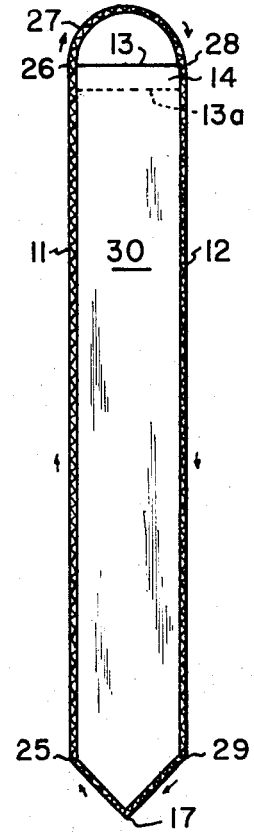
Fig.3A
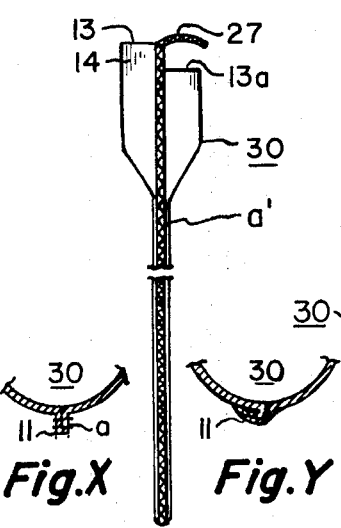
Fig.X  Fig.Y  Fig.3B
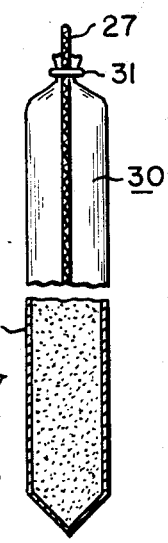
Fig.5
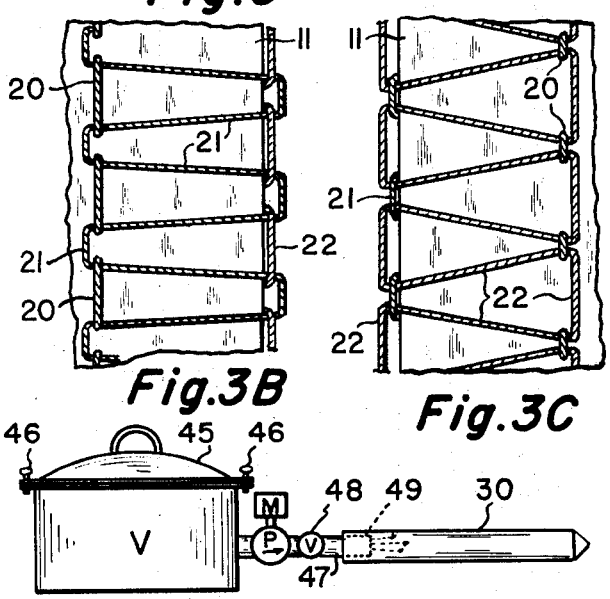
Fig.4  Fig.6  Fig.3C 3,873,737

METHOD OF MAKING AN ENCASED GROUND MEAT PRODUCT

BACKGROUND OF THE INVENTION

1. Field of the Invention

This invention relates to means and to procedure for making an improved artificial sock or casing for packaging food such as ground meat therein for customer merchandising.

2. Description of the Prior Art

As indicated in the Hofmann U.S. Pat. No. 3,635,738 of Jan. 18, 1972, it has been early practice in the art to use hog bungs for encasing or packaging food or ground meat products, such as Braunschweiger, sausage, etc. The difficulties and expense involved in the use of such a type of casing have been fully evaluated in the patent. The next advance in the art is represented by the use of a paperlike casing with the paper being reinforced by a low grade bung. Also, a casing using plies of material impregnated with a resin has been tried. The disclosure in the above-mentioned patent has enabled those skilled in the art to make sole use of a paperlike casing that is faced with an appetizing-appearing emulsion.

In providing an artificial sock or casing, it has been found important to use a material that will enable the butcher, as well as the housewife, to cross-slice-off desired quantities of the food product from an encased length for sale or usage. In this connection, it is desirable to employ a relatively thin wall casing which will have sufficient strength to support or retain a pressure-stuffed meat mixture or food product but which, at the same time, will be capable of being easily and accurately slit thereacross, without tearing or unevenness of cut. It is desirable to use a paperlike material whose fibers extend crosswise and which thus has a greater strength lengthwise. To make the casing, a patterned piece of paperlike material is folded or doubled-over flat along one side, with its open edges lying in an aligned relation along one longitudinal side, and along its top and bottom ends. A cloth tape or binder length of about one quarter or an inch in width is then sewed with a conventional forward stitch in a continuous manner advancing downwardly, starting from a lower portion of the folded-over side of the paper material in a half-circular path along the bottom end thereof, upwardly fully along the longitudinal extent of the opposite side that has the open edges, then, along a cross-extending top length or loop of the cloth binder, and finally downwardly a short distance longitudinally along an upper portion of the folded side to anchor the loop. The top loop serves as a hanger for the casing while an emulsion coating is being applied thereto. The stitching extends through the material of the pattern piece at equally spaced intervals and advances on both sides with equal, relatively short length loops.

In the above construction, it has been necessary to use a fabric binder to provide requisite strength of the casing as formed. It will be noted the binder is particularly needed around the rounded bottom end of the pattern piece where the stitching tends to some extent follow the cross fibers and thus weaken the material; it also enables the provision of hanger means at the top end of the casing. To provide the thus-sewn casing, it has been customary to sew the binder with a single thread continuous forward stitch at an inwardly spaced relation of approximately three-eighths to one-half inch from the side and bottom edges of the material. This results in a casing product that has relatively large projecting flaps along the sewed portions thereof. For this reason, it has been customary, because of the unsightly appearance effect thus presented by the stitching, to then turn the casing inside-out before the meat or other food product is inserted therein. Although, the wide, rough flaps are thus hidden, outwardly exposed seam valleys are then presented.

It has been customary for the maker of the casing to do the inverting before shipping the casings to the food processor. To accomplish this inversion or inside-out turning, it has been found to be necessary to wet each casing and to retain it in a fully wet condition until the food product is inserted therein. It has thus been customary to ship the casings in a wet condition and this is accomplished by placing them in a packed relation in a steel barrel having a suitable water content. When the casings arrive at the meat or food packing plant, they are stored under refrigeration, as otherwise the moisture tends to cause mildew and spoilage.

This type of casing has the further disadvantage in that the cloth binder tends to provide one side with a slightly greater weight than the other and to produce an uneven side along the folded longitudinal edge of the material. Even when, as customary, the casing is turned wrong side out, an uneven valley is provided which is difficult to mask with the application of an emulsion or other coating. The unevenly balanced nature of the casing also tends to cause it when filled to form a somewhat banana-like shape in the sense that it is not fully symmetrical or vertically cylindrical along its extent. Also, difficulty is encountered in endeavoring to provide an emulsion coating thereon that is smooth and of uniform thickness.

SUMMARY OF THE INVENTION

It has thus been an object of the invention to solve the problem presented by the manufacture and use of a casing of the above-described type and to, at the same time, make possible the full elimination of a conventional bung.

Another object has been to provide a new and improved form of casing and one that will not require inside-out turning or the wetting incident thereto.

A further object has been to develop a new and improved procedure for making a food product casing and for utilizing it.

A still further object has been to develop a new approach to the stitch forming of a paperlike food product receiving casing or sock.

These and other objects of the invention will appear to those skilled in the art from the illustrated embodiments and the claims.

In the drawings, FIG. 1 is a vertical view in elevation showing the construction of a casing which has heretofore been used and which has required turning inside-out.

FIG. 2 is a vertical view of a pattern piece that has been folded-over in preparation for forming a sock or casing in accordance with the invention.

FIG. 3 is a back side view similar to and on the scale of FIG. 2 illustrating a casing or sock constructed in accordance with a phase of the invention in which short lengths of the thread stitching are provided at the lower corners of the casing and serve as drip wicks for applied coating material.

FIG. 3A is a back side view on the scale of FIG. 3 showing a slightly modified form of casing in which the bottom portion has been stitched continuously and thus without forming the short length drip wick portions of FIG. 3.

FIG. 3B is a greatly enlarged fragmental vertical section at the location of the circle line IIIC of FIG. 3 and illustrating details of stitching employed as it appears from one side of the casing; and FIG. 3C is a similar section taken along the circle line IIIC of FIG. 3 showing details of the stitching as it appears from an opposite side of the casing. Further by way of illustration, FIG. 3B shows the stitching along the back side and FIG. 3C shows it along the front side of the casing.

FIG. 4 is a broken-away and partially sectioned vertical edge view in elevation on the scale of and taken at 90° with respect to FIGS. 2 and 3, showing the casing or sock ready to be stuffed with a ground food product, such as meat, with its upper open end being spread-out, ready to be placed on a horn (see FIG. 6) for pressure-stuffing and forming into a cylindrical shape. In this figure, the casing has been turned or rotated 90° about its longitudinal axis with respect to FIG. 3, with one seam shown extending centrally to the bottom apex or angle-shaped end thereof.

FIG. 5 is a broken-away and partially sectioned elevational view on the same scale and taken along the same side of the casing as FIG. 4, but showing the casing filled or stuffed and rounded-out with a ground food product therein, such as Braunschweiger or goose liver, and with its upper open end closed-off to retain the food product.

FIGS. X and Y are greatly enlarged somewhat diagrammatical fragmental sections illustrating how the seams as formed (see FIG. X) may be laid-down parallel with the casing wall (see FIG. Y) when the casing has been pressure-filled into a rounded, expanded shape by an operation such as illustrated in FIG. 6.

FIG. 6 is a greatly reduced, somewhat schematic view in elevation illustrating how the casings may be stuffed or filled with a ground food product.

Figure 7:
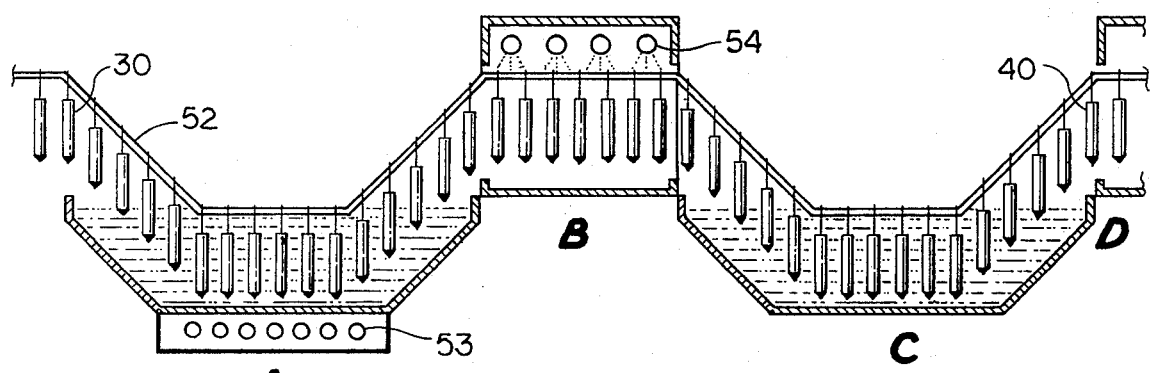

FIG. 7 is a reduced schematic side view in elevation illustrating a continuous processing line for taking the stuffed item shown in FIG. 5, to first cook or boil the meat or other food product therein, to then cool it, to apply an outer emulsion coating to its casing, and finally, to solidify and complete the coating formation such that the resultant product or item may be packaged and shipped for distribution and sale.

Figure 8:
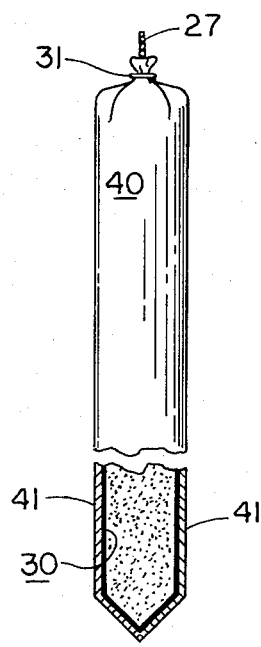

And, FIG. 8 is a vertical view, partially broken-away and sectioned, showing a complete food product or item after it has been processed in a line such as shown in FIG. 7. This figure is on the scale of FIGS. 4 and 5 and shows the paperlike casing or sock provided with a solidified outer emulsion coating that fully covers its flattened seams.

DESCRIPTION OF THE PREFERRED EMBODIMENT

In carrying out the invention, a piece of fibrous paperlike material of relatively thin thickness, whose fibers extend crosswise rather than lengthwise thereof, is cut to provide a substantially rectangular longitudinal shape or pattern piece 10. This piece is then folded or doubled-over upon itself (see FIG. 2) to provide abutting, complementary, aligned halves. The folded pattern piece 10 has a fold seam along one longitudinal side edge 11 and an open pair of edges along its opposed side 12. Its open bottom end is cut to provide it with a triangular shape, such that it has a pair of centrally downwardly converging sloped edges 15 and 16 (see the dotted lines of FIG. 2) that extend in a downwardly converging manner from opposite side corners to a centrally disposed bottom apex corner 17. The edges 15 and 16 define a 90° angle therebetween and a 45° angle with the longtiudinal side edges 11 and 12. Also, an upper cross portion of the front half at the upper open end of the pattern piece 10 may be cut-off to provide a downwardly offset edge 13a about an inch from a top edge 13 of the back half portion and thus leave an exposed top flap 14 on the back half portion for facilitating opening the casing to receive a food product stuffing. The pattern piece 10 as folded has a substantially elongated, flat, rectangular shape, defined by folded-over longitudinal side edge 11, opposite open side 12 having a pair of open edges, and open upper and lower ends. However, to complete the forming of a suitable pattern piece, the lower end is cut along dotted lines 15 and 16 to provide a triangular shape of open end portion having a central apex 17.

Stitching is accomplished by employing at least three cloth threads or strands 20, 21 and 22 of a suitable size, e.g. of an optimum of about No. 24 gauge which may then be continuously stitched, using a binding, so-called overcast, basket or blanket type of stitch. It is desirable to use all threads of the same gauge, with two of greater softness that serve as so-called "chain-off" (cross, edge-lapping) threads (see FIGS. 3B and 3C), and with the other one 20 of greater strength. It will be noted that for a given length of stitching, the threads 21 and 22 require a length of about one and one-half times the length of the thread 20. By way of example, the thread 20 may be a polyester impregnated cotton having a natural color, a left twist finish, and be of size 24, such as manufactured and sold by American Thread Company as its "Filco" thread, or any comparable high strength thread, such as used in fishing lines. Each thread 21 and 22 may be a four cord, cotton thread, natural color, left twist, size 24, such as manufactured and sold by American Thread Company as its "Intrinsic". As shown in FIGS. 3 and 4, the stitching of the main thread 20 is through the material at right angles to the fibers thereof, with loops on one side of the material (front side of FIG. 3C) being of shorter extent than loops on the other side (back side of FIG. 3B). The pair of threads 21 and 22 do not extend through the material. One thread 21 extends angularly crosswise of the material to form inner loops that loop or extend through back side loops of the thread 20, and to form outer loops that extend through or loop with outer edge loops of the thread 22. The thread 22, in turn, extends angularly crosswise along the front side of the material to extend through or loop at its inner reaches with front side smaller loops of the main thread 20, and to at its outer reaches loop through outer reach or edge loops of thread 21. It will be noted that the thread 22 is shown having outer and inner loops of wider extent than the thread 21.

The stitching (preferably machine type) may be started at one longitudinal end, such as at corner 25 of FIG. 3, and continued as *a* along one longitudinal side 11, across flap 14 of the back half of the pattern piece 10 to an upper end or cover 26. From the upper end 26 to opposite end or cover 28, the stitching is continued across the spacing, above top edge 13 to provide a chain link hanger loop 27, and is continued along the opposite longitudinal side 12 as a' to bottom end or corner 29. As shown in FIG. 3, if the stitching of a' is terminated at lower side corner or end 29, it may be continued a short distance before being cut to provide a short length thread braid or drip wick portion b. The stitching may then be restarted at 29 and continued as c along a second drip wick portion b. Finally, the stitching may be restarted and continued from apex 17 along edge 15 as d to lower side corner 25 to provide a third drip wick portion b. If no wicks are desired, the ends may be cut-off at the completion of each stitching length, or (see FIG. 3A) the stitching may be made continuous from 25 to 26 to 28 to 29 to 17 to 25. Although, as above indicated, the stitching may be continuous along the full outer edge extent of the pattern material, a three point stop and start operation at 29, 17 and 25 provides short length thread braids b that may serve as drip wicks for a later-applied liquid emulsion coating.

A completed casing 30 may have about a one-eighth of an inch width of reinforcing, crosswise-edge-overlapping, lengthwise-advancing stitching that extends a uniform distance from its edges, as represented by looping thread strands 21 and 22 (see FIG. 3B). One strand 21 loops across one side of the casing (see FIG. 3B) and the other strand 22 loops across the other side of the casing (see FIG. 3C). The casing 30 also has a longitudinally forwardly advancing stitch, as represented by thread strand 20 which loops longitudinally forwardly along the casing 30 to define the inner reaches of the stitching. The stitching provides a loose, chainlike hanger loop or thread braid 27 across and above the upper open end of the casing. As before indicated, in the embodiment of FIG. 3, shortlength thread braid or wick portions b extend from the ends, corners or connecting angles 17, 25 and 29.

It has been determined that the use of a basket or blanket type of thread stitching which overlaps and loops along both sides of the edges of the pattern piece 10, and which is advanced along the full edge extent of the opposed longitudinal sides, provides a practical and balanced casing product that is much stronger than casing 5 of the old process (see FIG. 1), and that makes possible the utilization of the casing 30 in its as-formed condition without reversing or turning it inside-out. The uniform, approximately one-eighth inch width of chainlike stitching, advances longitudinally crosswise of the fibers of the pattern piece, reinforces the piece in the direction of its cross or horizontally extending fibers, and does not weaken the finished article, but has been found to actually strengthen it.

The sewing is done in such a way that the upper portion of the woven thread linkage or chain forms a strong and effective loop 27 for hanging the casing, after a food product has been inserted therein, and when it is being hung after a liquid-like emulsion or other suitable coating or facing has been applied thereto to cover or mask its paperlike material. The full and balanced extent of the stitching, enables the casing 30 to be expansion-filled into a fully longitudinally symmetrical, cylindrical shape without unsymmetrical lengthwise deformation.

It has been determined that the stitching seams tend to flatten along the body of the adjacent material when the food product has been pressure-inserted or stuffed within the top opening of the casing (compare FIGS. X and Y), such that a cylindrical-shaped product results (see FIG. 5), and one whose side and bottom stitching may be completely camouflaged by the application of an emulsion coating, such as described in the previously-mentioned Hofmann et al. United States Patent. An edible type of liquid emulsion material, as set forth in U.S. Pat. No. 3,635,738 is highly suitable, in that among other things, it provides a snowy white pleasing color and has color retention. Such an edible aqueous emulsion liquid as set forth in the patent may contain gelatin, lard, milk powder and salt. The bottom wicks b, as provided by slight length extensions of stitch ends, enable a substantially uniform dripping-off of the emulsion, glycerine or other impregnating material so as to further assure an even, uniform coating, as solidified on the casing 30. When the emulsion approaches the end of its solidification period or cooling, then the surplus lengths of material b may be snipped-off, so that the emulsion will then cover up the portions represented by the bottom corners of the casing.

The material which is used in making a casing of the invention is a membranous, fibrous, porous, paperlike material which may have a weight of about 1.25 to 1.95 oz./yd. In this connection, an 850 paper gauge has been found to be sufficient. The use of a material that has a cross-extending fiber structure (horizontal of its length or vertical extent) is important from the standpoint of facilitating cutting-off of portions of the final product by the butcher and particularly, the housewife. It is also important in minimizing the cost, such that the material as used with an emulsion or other suitable coating or facing will be competitive pricewise with even low grade hog bung casings. However, a cloth tape or binder (see 7 of FIG. 1) tends to cause tearing and uneven slicing of portions from an encased food product by the butcher or housewife. A so-called "Viskon" sheet product (available in unfolded 30 × 10 inches sheets), S-850-CF, is a fully satisfactory paperlike fabric. It is a relatively inexpensive material and is cut in such a manner that its fibers extend fully transversely of the pattern piece 10 from which the casing 30 is formed. This representative material is manufactured and sold by Chicopee Mills, Inc. under the above trademark and is an industrial non-woven fabric used for filter and wiping cloths, skirt linings, etc.

In order to provide the casing 30 with requisite strength for pressure-receiving and supporting the food product therein, a special triangular shape of bottom end portion (see FIGS. 3 and 3A) has been devised which gives maximized strength and enables the elimination of the reinforcing cloth binder or tape 7 (see FIG. 1), and which avoids extension of stitching substantially parallel to the fibers, such as represented by curved bottom portion 8a of single thread stitching 8 of FIG. 1. The triangular construction has been found to provide a greatly strengthened bottom end portion over the rounded stitching 8a, such as heretofore employed and which has heretofore required the use of a binder tape 7 centrally along which the stitching 8 extends. The plural thread basket or blanket type of weave of the present stitching further greatly contributes to the strength of the product as produced.

In the old construction of FIG. 1, fabric tape 7 has a somewhat irregular or non-uniform spacing from outer edges of casing 5, is not continuous along folded-over side edge 6, and has a short length along the upper portion of the edge 6 only sufficient to tie-down the end of its hanger loop 7b. The stitching 8 is of a single thread, conventional longitudinal advancing type that has no cross or edge-reinforcing pattern, and is located substantially centrally of the cloth tape or binding material 7. The final casing product 5 has parallel top and bottom edges 6a and 6c. The portion of the casing which lies along bottom tape portion 7a and stitching portion 8a should be of the best possible strength, since it has to support the weight of the food product. It is actually the weakest portion in this form of casing. Also, the somewhat irregular mounted contour of the tape 7 and stitching 8, as well as their discontinuous extent along folded side edge 6, gives the casing 5 an unbalanced construction that creates a banana-like shape when the casing has been stuffed with a food product. In the prior art casing 5 of FIG. 1, 6a represents the upper end of the casing as defined by aligned, open upper ends, 6b represents the open side, and 6c represents the open bottom end.

The casing 30 constructed in accordance with the invention has been found to provide a fully practical, inexpensive packaging means for various meat products, such as liverwurst, head and liver cheeses, etc. The filling of the casing 30 tends to cause the thread seams to be forced into an abutting or flattened relation with the adjacent outer surface of the material. Ordinarily a completed liverwurst product 40, as illustrated in the processing line of FIG. 7, is cooked or boiled in water (see station A) after it has been inserted in the casing 30, and before the casing is provided with an attractive emulsion coating 41 in a manner illustrated in U.S. Pat. No. 3,635,738.

If smoked products are being made, the somewhat permeable or porous material of the casing enables smoke and flavoring vapors to be introduced to the meat product while it is being suspended within a preliminary treating chamber. It has been determined that a stiffening cardboard rib or the like is no longer necessary to reinforce the casing. The lap-over type of stitch seam of the present invention strengthens the flap edge, as well as the folded-over edge of the casing and, in no sense, tends to weaken them. The single forward stitching 8, 8a of the old type of casing 5 of FIG. 1 of necessity requires a cloth tape 7. Although any color and suitable thickness of paper may be used, white is preferred. An emulsion which is applied as a surface coating, not only serves to protect and maintain the food product in a desirable moist and fresh condition, but to also give sales appeal and provide means for basting foods. It may have a thickness of up to about one-fourth and not less than about one thirty-second of an inch, with an optimum of about one-sixteenth of an inch.

By way of example, a suitable size of pattern piece 10 for a casing or sock to be used for liverwurst and the like when folded-over a pattern piece and stitched, is about 28 inches long by 45 inches wide. A casing 30 of this size will carry about 5 pounds of meat.

The angular or pointed bottom of the construction of the casing is important due to the non-woven nature of the papar material or fabric and, in this connection, the stitching must travel principally against the fibers or grain to avoid weakening or cutting, splitting or tearing of the material. The chain loop 27 at the top of the casing serves as an anchor for the product throughout various operations. Conventional string tieing or metal clamping means 31 (see FIGS. 5 and 8) is applied after the food product has been inserted and is used primarily as a closure means, while the loop 27 is used primarily for suspending or hanging the filled casing product 40 during further processing, such as illustrated in FIG. 7.

FIG. 6 is illustrative of how a casing such as 30 may be stuffed or pressure-filled with a food product, such as ground meat, by inserting it on a feed horn 49 through which the food product is fed from a vat V along pipe or conduit 47 by means of a pump P that may be driven by a suitable electric motor M. When the casing 30 is filled, the flow may be stopped by closing valve 48 and, if desired, by shutting off the motor M. The food product may be introduced to the vat V through a top opening therein which, for simplicity, is shown covered by a lid closure 45 that is held in a clamped-in sealed-on relation by thumbscrews 46. After the casing 30 has been filled to provide a cased product 40 (see FIG. 6), the upper ends of the casing may be closed by a metal clip or a string tie 31, as illustrated in FIGS. 4 and 5. Subsequently, (see FIG. 7) a line of filled casings 40 may be hung from a continuous conveyor 52 and then moved into and through a cooking or boiling area or chamber A which is shown provided with heating elements 53.

After being suitably cooked, the cased products 40 are shown moved by the conveyor 52 into and through a cooling chamber B and subjected to cooling air sprays 54. In the next step, the filled casings 40 are shown moved by the conveyor 52 into and through an emulsion-application dip or bath C and thereafter into and through a drip and solidification chamber D. Near the end of the chamber D, if wicks such as b are provided, then they will be snipped or cut-off before the coating has fully solidified, so that an emulsion coating 41 will seal-off the corners 25, 17 and 29 of the casing to provide a finished food product 40 (see FIG. 8).

We claim:

1. In a method of making an encased product of ground meat, folding-over a length of porous paperlike material and forming a pattern piece having a closed longitudinal side, an open opposed longitudinal side and open upper and lower ends; forming the lower end into a substantially triangular shape, applying an edge-overlapping stitching substantially fully along the sides and the lower end of the pattern piece to form a casing open at its upper end, pressure-stuffing ground meat into the casing from its upper open end, closing-off the upper end of the casing and forming a substantially symmetrical cylindrical-shaped product whose stitched portions have a substantially flattened relation along the outer surface of the casing, thereafter applying an edible liquid coating material about the casing of the product and solidifying the liquid as a substantially uniform coating thereon.

2. In a method as defined in claim 1, continuing the stitching between the sides and above the upper end of the pattern piece and forming a chainlike hanger loop, and suspending the product from the hanger loop while dipping it within the liquid coating material and while dripping-off excess liquid material from its casing and solidfying the remaining coating material thereon.

3. In an encased ground meat product in package form for display and an easily sliced usage, a relatively thin wall supporting casing of smooth, porous, paperlike material having a pair of substantially opposed reinforcing exterior stitching along its opposite sides and having substantially triangular-patterned stitching closing-off its lower end, a ground meat product in a pressure-stuffed relation within the casing, a chain-like hanger loop of the stitching extending across from upper ends of and connected to the side stitching of the casing, means for closing-off the upper end of the casing and the ground meat therein, said casing with the meat product therein being of substantially symmetrically rounded and longitudinally elongated shape, and an edible coating about the outer side and bottom end wall portions of the casing in a substantially smooth and even thickness relationship thereabout to cover the casing and hold the stitching in a substantially covered-up relation therealong.

4. In a product as defined in claim 3, a flap extending upwardly from one side of the casing at its upper end for facilitating introducing the ground meat therewithin.

5. In a product as defined in claim 4, the material of said casing having cross-extending fibers along its length, and the stitching comprising threads that have a basket type of pattern in which one of its threads advances longitudinally of and extends through the material at substantially right angles to its fibers and in which two of its threads have an edge-overlapping and crosswise angularly extending relation with respect to the one thread.

6. In an encased ground meat product as defined in claim 5, said coating being in the form of an edible emulsion material applied as a liquid that is dripped from and solidified on the outer surface of the casing.

* * * * *